UNITED STATES PATENT OFFICE.

BELA W. ROTE, OF ELYRIA, OHIO, ASSIGNOR TO L. J. WEADOCK, OF ELYRIA, OHIO.

PLASTIC COMPOSITION.

1,318,804.  Specification of Letters Patent.  Patented Oct. 14, 1919.

No Drawing.  Application filed September 10, 1917. Serial No. 190,585.

*To all whom it may concern:*

Be it known that I, BELA W. ROTE, a citizen of the United States, resident of Elyria, county of Lorain, and State of Ohio, have invented new and useful Improvements in Plastic Compositions, of which the following is a specification, the principle of the invention being herein explained and the best mode in which I have contemplated applying that principle, so as to distinguish it from other inventions.

My invention relates to a plastic composition, and particularly to a composition for use in manufacturing shoe structures. More particularly, my invention relates to a composition for making the heels and soles of shoes. Said improved plastic composition is designed to furnish a sole and heel structure which shall be extremely resilient, durable and economical.

My improved composition consists of substantially equal portions of coarse rubber and a composition consisting of long fibered cotton and high-grade rubber, friction and skim, each of these constituents being used in substantially greater amounts than any one of the other constituents; an alkaline earth, such as magnesia, or an equivalent; a compound of antimony and sulfur, the magnesia content and the antimony and sulfur content being substantially equal in amount; preferably a second alkaline earth, such as lime or an equivalent, in a comparatively small amount relative to the aforementioned ingredients; an oxid of one of the true metals and a vulcanizing constituent, said latter two constituents being substantially equal in amount and each substantially greater in amount than the lime and substantially less in amount than the magnesia or antimony and sulfur. I have ascertained that the following constituents in approximately the following proportions furnish a very satisfactory composition: Eight (8) pounds of coarse rubber, preferably up-river coarse Pará; three (3) pounds magnesia; nine (9) pounds rubber and cotton composition (high-grade friction, consisting of equal parts of long fibered cotton and high-grade rubber, friction and skim, practically pure gum); two and three-quarters (2¾) pounds antimony 20 R. S. (containing substantially twenty per cent. (20%) sulfur); one-half (½) pound lime; one (1) pound zinc-oxid; and one (1) pound of sulfur. By "high-grade friction, consisting of equal parts of long fibered cotton and high-grade rubber, friction and skim, practically pure gum," I mean the following: In the construction of various fabric articles, tires, for instance, a practically pure gum mass is prepared of from 75 to 90 per cent. rubber content and is forced into the fabric by what is known as a frictioning process, *i. e.*, on a calendar running at friction motion. This practically pure gum mass in uncured gum of 75 to 90 per cent. rubber content and the balance a filler or auxiliator, such as lead pigment, and a fusing agent. During the later process of vulcanizing, the fusing agent leaves the cured stock. After this rubber content is forced into the fabric, a skim coat is applied, after which the friction and skim coat practically equals the fabric in weight. This fabric and friction and skim composition is then ground up, on a cracker or rubber washer, consisting of one corrugated and one smooth roll, or on a mixing mill consisting of two smooth rolls running at different speeds, into a pulp. This pulp then consists of substantially 40 to 45 per cent. long fibered cotton, 40 to 45 per cent. pure gum rubber, and 10 to 20 per cent. filler and fusing agent.

"Two and three-quarters (2¾) pounds antimony, 20 R. S." means that this amount of antimony compounds containing certain proportions of coloring matter is used when the combined amounts of the rubber and substitute ingredients aggregate substantially twenty (20) pounds. In other words, in the preferred proportions outlined above, it will be noted that applicant uses two and three-quarters (2¾) pounds golden antimony, together with twenty-two and one-half (22½) pounds combined amounts of all the other ingredients. All of the antimony used contains a certain amount of sulfur, and this amount is taken into consideration in connection with the composition desired and the proportion of free sulfur used. As the amount of sulfur present in the antimony is increased, the per cent. of free sulfur is decreased. Also, of course, the amount of sulfur derived from the antimony might be increased by increasing the amount of antimony compound containing the same proportion of sulfur, in which case also the amount of free sulfur would be correspondingly reduced. Furthermore, antimony is furnished in different colors, so that two and one-quarter (2¼) pounds of golden antimony and three-quarters (¾) pound of crimson antimony might be used instead of substantially three (3) pounds of golden antimony. In this event, the composition produced would be the same except that the coloring effects would be very different.

The preferred composition contains both the alkaline earths: magnesia and lime. However, a very satisfactory composition can be obtained by leaving out the lime entirely.

Into the pulp or mass prepared as above, the other ingredients are mixed and the batch is then formed into sheets of the desired proportions. From these sheets are stamped out the heel and sole parts of the desired shapes. These parts are molded into heels and soles, then cured or vulcanized under forty (40) pounds steam pressure for a period of one hundred and twenty (120) minutes.

I wish to be understood that the above mentioned ingredients represent merely one formula of my new and improved composition and that, within the limits above mentioned, different constituents and different proportions might be used without departing from the spirit of my invention.

The above described composition with the constituents and proportions thereof of the properties and ratios mentioned produces heels and soles which are leather-like in their toughness and durability, render an unusually satisfactory cushion action, are unaffected by successive wetting and drying, and are very economical.

What I claim is:

1. A new and improved plastic composition, comprising substantially equal parts of coarse rubber and a composition consisting of long-fibered cotton and high-grade rubber, friction and skim; an alkaline earth in amount substantially less than either the rubber or the rubber and cotton content; a compound of antimony and sulfur in amount substantially equal to the alkaline earth content and containing a minor proportion of sulfur; an oxid of one of the true metals and a vulcanizing constituent in substantially equal amounts and each substantially less in amount than either the alkaline earth or the antimony and sulfur content.

2. A new and improved plastic composition, comprising substantially equal parts of coarse rubber and a composition consisting of long fibered cotton and high-grade rubber, friction and skim; an alkaline earth in amount substantially less than either the rubber or the rubber and cotton content; a compound of antimony and sulfur containing a minor proportion of sulfur; an oxid of one of the true metals in amount substantially less than the alkaline earth content; and sulfur, the antimony and sulfur compound and the free sulfur being in combined amount somewhat less than one-half the rubber or the rubber and cotton content.

3. A new and improved plastic composition, comprising substantially equal parts of coarse rubber and a composition consisting of long fibered cotton and high-grade rubber, friction and skim; an alkaline earth in amount substantially less than either the rubber or the rubber and cotton content; compounds of antimony of different colors in combined amount substantially equal to the alkaline earth content and containing a minor proportion of those ingredients which are other than antimony; an oxid of one of the true metals and a vulcanizing constituent in substantially equal amounts and each substantially less in amount than either the alkaline earth or the combined antimony compounds.

4. A new and improved plastic composition, comprising substantially equal parts of up-river coarse Pará rubber and a composition consisting of long-fibered cotton and high-grade rubber, friction and skim; magnesia in amount substantially one-sixth the rubber and cotton contents; a compound of antimony and sulfur substantially equal to the magnesia content and containing substantially 20 per cent. sulfur; lime in amount substantially one-sixth of the magnesia content; zinc oxid and sulfur in substantially equal amounts and each substantially equal to one-third of the magnesia or the antimony and sulfur content.

5. A new and improved plastic composition, comprising the following constituents in approximately the following proportions: Eight (8) pounds up-river coarse Pará rubber; three (3) pounds magnesia; nine (9) pounds of a composition consisting of long fibered cotton and high grade rubber, friction and skim; two and three-quarters (2¾) pounds of a compound of antimony and sulfur containing substantially twenty per cent. (20%) of the latter; one (1) pound of zinc oxid, and one (1) pound of sulfur.

6. A new and improved plastic composition, comprising the following constituents in approximately the following proportions: eight (8) pounds up-river coarse Pará rubber; three (3) pounds magnesia; nine (9) pounds of a composition consisting of substantially equal parts of long-fibered cotton and high-grade rubber, friction and skim; two and three quarters (2¾) pounds of a compound of antimony and sulfur containing substantially twenty per cent. (20%) of the latter; one-half (½) pound of lime; one (1) pound of zinc oxid and one (1) pound of sulfur.

Signed by me, this 30″ day of August, 1917.

BELA W. ROTE.